United States Patent [19]

Sano et al.

[11] Patent Number: 5,369,193
[45] Date of Patent: Nov. 29, 1994

[54] PROCESS FOR PREPARING POLYOLEFINS

[75] Inventors: Akira Sano; Takeichi Shiraishi, both of Kawasaki; Kunihiro Suzuki; Mitsuo Okamoto, both of Yokohama; Kazuo Matsuura, Tokyo, all of Japan

[73] Assignee: Nippon Oil Company, Limited, Tokyo, Japan

[21] Appl. No.: 967,556

[22] Filed: Oct. 27, 1992

Related U.S. Application Data

[63] Continuation of Ser. No. 553,109, Jul. 13, 1990, abandoned.

[30] Foreign Application Priority Data

Jul. 17, 1989 [JP] Japan ................. 1-182474

[51] Int. Cl.$^5$ ............................................. C08F 4/685
[52] U.S. Cl. ........................... 526/116; 526/119; 526/125; 526/114
[58] Field of Search ............... 526/116, 119, 125, 129, 526/114

[56] References Cited

U.S. PATENT DOCUMENTS

| | | | |
|---|---|---|---|
| 3,701,766 | 10/1972 | Delbouille et al. | 526/129 |
| 4,154,915 | 5/1979 | Matsuura et al. | 526/125 |
| 4,396,534 | 8/1983 | Matsuura et al. | 526/125 |
| 4,558,024 | 12/1985 | Best | 526/142 |
| 4,613,581 | 9/1986 | Maruyama et al. | 526/125 |
| 4,732,882 | 3/1988 | Allen et al. | 526/125 |

FOREIGN PATENT DOCUMENTS 2521662 11/1975 Germany.
1292853 10/1972 United Kingdom.

*Primary Examiner*—Romulo H. Delmendo
*Attorney, Agent, or Firm*—Dilworth & Barrese

[57] ABSTRACT

Polyolefins exhibiting better particle properties are prepared by polymerizing an olefin or olefins in the presence of a catalyst comprising a solid catalyst component and an organometallic compound, the solid catalyst component being prepared by reacting the following components [I] and [II] at first and then reacting the reaction product thus obtained with the following component [III]:

[I] a reaction product obtained by reacting:
  (1) a silicon oxide and/or an aluminum oxide, and
  (2) a titanium compound, or a titanium compound and a vanadium compound,

[II] a reaction product obtained by the reaction of:
  (1) a magnesium halide,
  (2) a compound represented by the general formula $Me(OR)_nX_{z-n}$ wherein Me represents an element of J Groups I to IV in the Periodic Table, z represents the valence of the element Me, n is $0 < n \leq z$, X is a halogen atom, and R is a hydrocarbon residue having 1 to 20 carbon atoms, and
  (3) a titanium compound, or a titanium compound and a vanadium compound; and

[III] an organoaluminum compound.

18 Claims, 1 Drawing Sheet

PROCESS FOR PREPARING POLYOLEFINS

This is a continuation of copending application Ser. No. 07/533,109 filed on Jul. 13, 1990, now abandoned.

BACKGROUND OF THE INVENTION

The present invention relates to a process for preparing novel polyolefins. More particularly, the present invention is concerned with a process fop preparing polyolefins exhibiting better particle properties with increase of an average particle diameter, which process is capable of greatly increasing the polymer yield per solids and that pep transition metal, thereby permitting the omission of the step of removing catalyst remaining in the resulting polymer, further capable of increasing the bulk density of the polymer and decreasing a fine particulate portion of the polymer.

Heretofore, in this technical field there have been known many catalysts comprising inorganic magnesium solids as carriers such as magnesium halide, magnesium oxide and magnesium hydroxide and a transition metal compound such as a titanium compound or a vanadium compound supported on the carriers. However, the polyolefins obtained in the prior art are generally low in bulk density, relatively small in average particle diameter and generally wide in particle size distribution so contain a large proportion of fine particles. For this reasons, improvement has keenly been desired from the standpoint of productivity and polymer handling. Besides, when these powdery polymers are subjected to forming, there arise problems such as dusting and lowering of the forming efficiency. So there has been a keen desire for the foregoing increase of bulk density and decrease of the fine particulate portion. Further, still further improvements are considered necessary in order to satisfy the recent keen desire for omitting the pelletizing step and using a powdery polymer directly in a processing machine.

The present inventors have previously found out a novel catalyst component with tile above drawbacks remedied and already filed patent applications thereon (see Japanese Patent Publication Nos. 11651/1989 and 12289/1989 and Japanese Patent Laid-Open Nos. 149605/1985, 32105/1987 and 207306/1987). The use of this catalyst component can afford a polymer having a high bulk density and a large average particle diameter. However, a further improvement has been considered necessary for omitting the pelletizing step and using a powdery polymer directly in a processing machine.

It is the object of the present invention to remedy the above-mentioned drawbacks and obtain in extremely high activity a polymer having a high bulk density, a narrow particle size distribution, an extremely small proportion of fine particles, and superior in fluidity.

SUMMARY OF THE INVENTION

The present invention resides in a process for preparing a polyolefin by polymerizing or copolymerizing an olefin or olefins in the presence of a catalyst comprising a solid catalyst component and an organometallic compound, the said solid catalyst component being prepared by reacting the following components [I] and [II] at first and then reacting the reaction product thus obtained with the following component [III]:

[I] a reaction product obtained by
  (1) a silicon oxide and/or an aluminum oxide, and
  (2) a titanium compound, or a titanium compound and a vanadium compound,
[II] a reaction product obtained by the reaction of:
  (1) a magnesium halide,
  (2) a compound represented by the general formula $Me(OR)_n X_{z-n}$ wherein Me represents an element of I to IV in the Periodic Table, z represents the valence of the element Me, n is $0 < n \leq z$, X is a halogen atom, and R is a hydrocarbon residue having 1 to 20 carbon atoms, and
  (3) a titanium compound, or a titanium compound and a vanadium compound; and
[III] an organoaluminum compound.

By the process of the present invention there is obtained, in extremely high activity, a polyolefin having a relatively large average particle diameter, a narrow particle size distribution and a reduced proportion of fine particles. Besides, the bulk density and free fluidity the polyolefin are high. These characteristics are very advantageous to the polymerization operation. Further, the polyolefin prepared by tile process of the present invention can be subjected to forming not only as pellets but also In the form of powder, without causing any trouble.

It is also a characteristic feature of the present invention theft tile polymer obtained using the catalyst specified in the present invention is extremely narrow its molecular weight distribution and small in the amount thereof extracted in hexane, and that the amount of low grade polymers by-produced is very small. Therefore, when film is formed using the polyolefin of a narrow molecular weight distribution prepared by the process of the present invention, it has a lot of merits, for example, high transparency, superior anti-blocking property and heat-sealability.

BRIEF DESCRIPTION OF THE DRAWINGS

The FIGURE is a flowchart showing a manufacturing process for the catalyst used in the present invention.

DETAILED DESCRIPTION OF THE INVENTION

Figure 1:
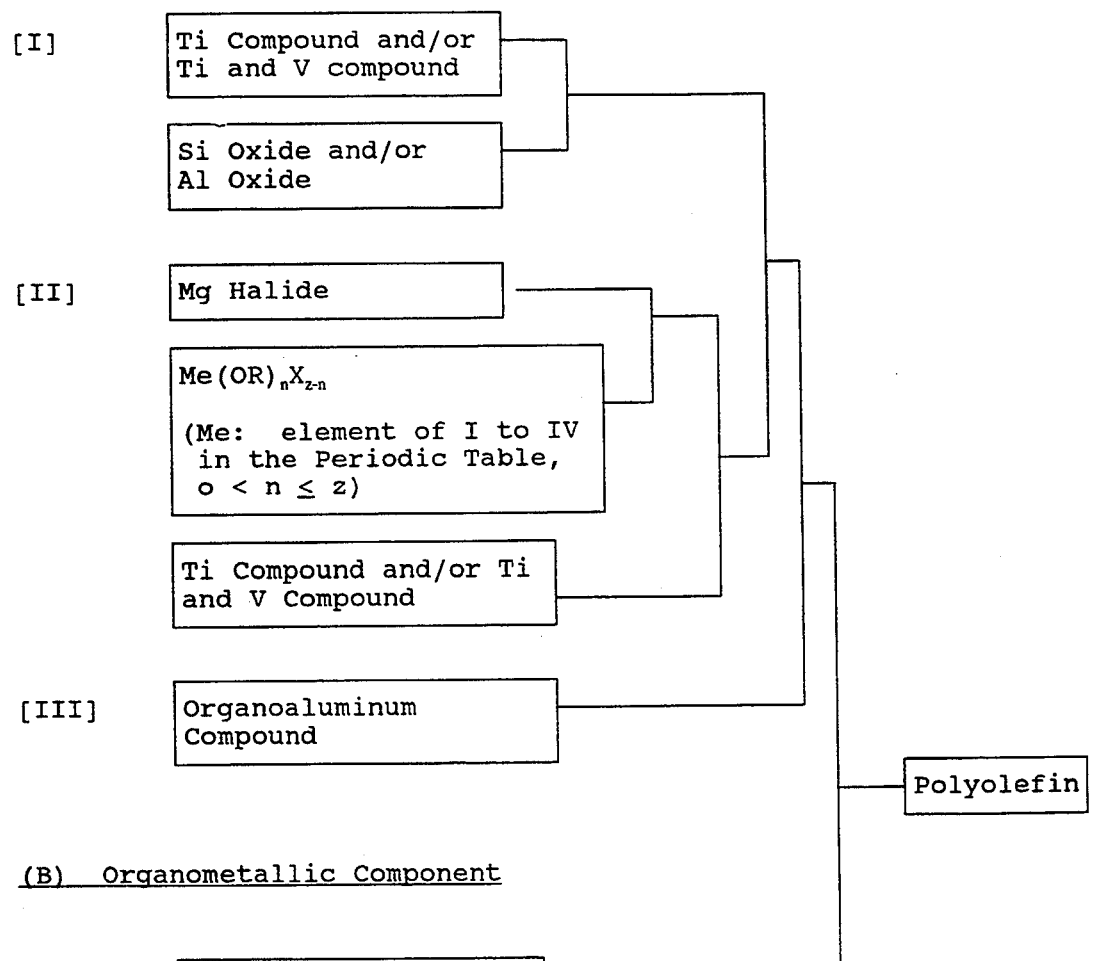

The present invention will be described concretely hereinunder.

The catalyst used in the polyolefin preparing process of the present invention comprises a solid catalyst component and an organometallic compound, the said solid catalyst component being prepared by reacting the following components [I] and [I] at first and then reacting the reaction product thus obtained with the following component [III]: [I] a reaction product obtained by reacting (1) a silicon oxide and/or an aluminum oxide with (2) a titanium compound, or a titanium compound and a vanadium compound (component [I]); [II] a reaction product obtained by the reaction of (1) a magnesium halaide, (2) a compound of the general formula $Me(OR)_n X_{z-n}$ and (3) a titanium compound, or a titanium compound and a vanadium compound (component [II]); and [III] an organoaluminum compound (component [III]).

<1> Solid Catalyst Component

1. Component [I]

The silicon oxide used in the present invention is silica or a double oxide of silicon and at least one another metal selected from Groups I–VIII of the Periodic Table.

The aluminum oxide used as component (1) in the present invention is alumina or a double oxide of aluminum and at least one another metal selected from Groups I-VIII in the Periodic Table.

As typical examples of the double oxide of silicon aluminum and at least one another metal selected from Groups I-VIII in the Periodic Table there are mentioned various natural and synthetic double oxides such as $Al_2O_3 \cdot MgO$, $Al_2O_3 \cdot CaO$, $Al_2O_3 \cdot SiO_2$, $Al_2O_3 \cdot MgO \cdot CaO$, $Al_2O_3 \cdot MgO \cdot SiO_2$, $Al_2O_3 \cdot CuO$, $Al_2O_3 \cdot Fe_2O_3$, $Al_2O_3 \cdot NiO$, and $SiO_2 \cdot MgO$. It is to be noted that these formulae are not molecular formulae but represent only compositions and that the structure and component ratio of the double oxide used in the present invention are not specially limited thereby. It goes without saying that the silicon oxide and/or aluminum oxide used in the present invention may have a small amount of water absorbed therein or may contain a small amount of imprities.

Although the properties of the silicon oxide and/or aluminum oxide used in the present invention are not specially limited so far as the objects of the present invention are not adversely affected thereby, a silica having a particle diameter of 1 to 200μ, an average pore volume of greater than 0.3 ml/g and a surface area of greater than 50 m²/g is preferred, Also, it is preferably calcined at 200°–800° C. by a conventional method prior to use.

As examples of the titanium compound and vanadium compound contacted with the silicon oxide and/or aluminum oxide there may be mentioned halides, alkoxyhalides, alkoxides and halogenated oxides of titanium and vanadium. Preferred examples or the titanium compound in the present invention are tetravalent and trivalent titanium compounds. As tetravalent titanium compounds, those of the general formula $Ti(OR)_nX_{4-n}$ are preferred wherein R is an alkyl, aryl or aralkyl group having 1 to 20 carbon atoms, X is a halogen atom and n is $0 \leq n \leq 4$. Examples are titanium tetra halides such as titanium tetrachloride, titanium tetrabromide and titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, tetraisopropoxytitanium, monobutoxytrichlorotitanium, dibutoxydichlorotitanium, tributoxymonochlorotitanium, tetrabutoxytitanium, monopentoxytrichlorotitanium, monophenoxytrichlorotitanium, diphenoxydichlorotitanium, triphenoxymonochlorotitanium and tetraphenoxytitanium. As trivalent titanium compounds there may be used, for example, titanium trihalides obtained by reducing titanium tetrahalides such as titanium tetrachloride and titanium tetrabromide with hydrogen, aluminum, titanium or an organometallic compound of a metal selected from Groups I through III in the Periodic Table as well as trivalent titanium compounds obtained by reducing tetravalent alkoxytitanium halides or tetraalkoxytitaniums of the general formula $Ti(OR)_mX_{4-m}$ wherein R is an alkyl, aryl or aralkyl group having 1 to 20 carbon atoms, X is a halogen atom and m is $0 < m \leq 4$, with an organometallic compound of a metal selected from Groups I through III in the Periodic Table. Among them, titanium tetrahalides are most preferable.

As examples of the vanadium compound are mentioned tetravalent vanadium compounds such as vanadium tetrachloride, vanadium tetrabromide, vanadium tetraiodide, and tetraethoxyvanadium; pentavalent vanadium compounds such as vanadium oxytrichloride, ethoxydichlorovanadyl, triethoxyvanadyl, and tributoxyvanadyl; and trivalent vanadium compounds such as vanadium trichloride and vanadium triethoxide.

When the titanium compound and the vanadium compound are used together, it is preferable that the V/Ti molar ratio be in the range of 2/1 to 0.01/1.

The reaction ratio of the silicon oxide and/or the aluminum oxide, (hereinafter referred to simply as component [I]-(1)), and the titanium compound, or the titanium compound and the vanadium compound, (simply as component [I]-(2) hereinafter), differs depending on whether the component [I]-(1) is subjected to a calcing treatment or not and conditions for the calcining treatment, but it is desirable to use the component [I]-(2) in an amount of 0.01 to 10.0 mmol, more preferably 0.1 to 5.0 mmol, still more preferably 0.2 to 2.0 mmol, per gram of the component [I]-(1).

How to react the components [I]-(1) and [I]-(2) is not specially limited as long as the object of the present invention is not impaired. But according to a prefered method, both components are mixed together under heating at a temperature of 20° to 300° C., preferably 50° to 150° C., for 5 minutes to 10 hours, in the presence of an inert hydrocarbon solvent (later described) which has been subjected to a dehydration treatment to a thorough extent, or both components are contacted together as they are in the presence of an inert hydrocarbon, to obtain the reaction product (component [I]).

After contact reaction of the components [I]-(1) and [I]-(2), the reaction product may be washed several times with an inert hydrocarbon solvent. After this contact reaction of both components, the inert hydrocarbon solvent may be removed by evaporation, or the operation may proceed to the next contact reaction with the component [II] without such evaporation.

2. Component [II]

As the magnesium halide [II]-(1) there is used substantially anhydrous one. Examples are magnesium dihalides such as magnesium fluoride, magnesium chloride, magnesium bromide, and magnesium iodide, with magnesium chloride being particularly preferred.

These magnesium halides may have been treated with electron donors such as alcohols, esters, ketones, carboxylic acids, ethers, amines, and phosphines.

As examples of the compound [II]-(2) of the general formula $Me(OR)_nX_{z-n}$ used in the present invention wherein Me represents an element of Groups I to IV in the Periodic Table, z represents the valence of the element Me, n is $0 < n \leq z$, X is a halogen atom, and R is a hydrocarbon residue having 1 to 20 carbon atoms such as, for example, alkyl, aryl, or aralkyl, and Rs may be the same or different, there are mentioned compounds represented by $NaOR$, $Mg(OR)_2$, $Mg(OR)X$, $Ca(OR)_2$, $Zn(OR)_2$, $Cd(OR)_2$, $B(OR)_3$, $Al(OR)_3$, $Al(OR)_2X$, $Al(OR)X_2$, $Si(OR)_4$, $Si(OR)_3X$, $Si(OR)_2X_2$, $Si(OR)X_3$, $Si(OR)X_3$, and $Sn(OR)_4$). More concrete and preferred examples are $Mg(OC_2H_5)_2$, $Mg(OC_2H_5)Cl$, $Al(OCH_3H)_3$, $Al(OC_2H_5)_3$, $Al(On-C_3H_7)_3$, $Al(Oi-C_3H_7)_3$, $Al(On-C_4H_9)_3$, $Al(Osec-C_4H_9)_3$, $Al(Ot-C_4H_9)_2$, $Al(OCH_3)_2Cl$, $Al(OC_2H_5)_2Cl$, $Al(OC_2H_5)Cl_2$, $Al(Oi-C_3H_7)_2Cl$, $Al(Oi-C_3H_7)Cl_2$, $Si(OC_2H_5)_4$, $Si(OC_2H_5)_3Cl$, $Si(OC_2H_5)_2Cl_2$, $Si(OC_2H_5)Cl_3$. The titanium compound, or the titanium compound and the vanadium compound (simply as component [II]-(3) to be reacted with the magnesium halide (simply as component [II]-

(1)) and the compound represented by the general formula Me(OR)$_n$X$_{z-n}$ (simply as component [II]-(2)) may be optionally selected from various titanium compounds and vanadium compounds used as the before merit toned compound [I]-(2) and either the same compound as or different compound from the compound used as component [I]-(7) may be used. Preferably used is a titanium compound represented by the general formula Ti(OR)$_n$X$_{4-n}$ wherein R is an alkyl, aryl or aralkyl group having 1 to 20 carbon atoms, X is a halogen atom and n is 0<n<4. Tetraalkoxytitaniums are most preferable.

It is preferable that the reaction ratio of the component [II]-(2) to the component [II]-(1) is in the range of 0.01 to 10, preferably 0.1 to 5 in terms of Me/Mg (molar ratio).

It is preferable that the reaction ratio of the component [II]-(3) to the component [II]-(1) (molar ratio) is in the range of 0.01 to 5, preferably 0.05 to 1.0.

When contacting the components [II]-(1), [II]-(2) and [II]-(3), the order of this contact is not specially limited. The components [II]-(1), [II]-(2) and [II]-(3) may be contacted together at a time, or in a desired order. Preferably, the three components may be contacted together simultaneously, or the components [II]-(1) and [II]-(2) are contacted together beforehand as noted previously, and thereafter the component [II]-(3) is contacted with them.

The contact reaction method is not specially limited. There may be adopted a method in which the components are co-pulverized using, for example, ball mill, vibration mill, rod mill, or impact mill, at a temperature of 0° to 200° C., for 30 minutes to 50 hours, in the presence or absence of an inert hydrocarbon solvent. Or there may be adopted a method in which the components are mixed and reacted together under heating at a temperature of 20° C. to 400° C., preferably 50° to 300° C., for 5 minutes to 10 hours, in an organic solvent such as inert hydrocarbons, alcohols, phenols, ethers, ketones esters or mixtures thereof (these organic solvents will later be explained concretely), and thereafter the solvent is evaporated off. In the present invention, preferably, the components [II]-(1) and [II]-(2) are copulverized, thereafter the compulverized product and the component [II]-(3) are reacted in an organic solvent and thereafter the solvent is removed by evaporation.

Thus, the component [II] is obtained.

3. Component [III]

As the organoalumium compound used as the component [III] in the present invention, a compound represented by the general formula R$_n$AlX$_{3-n}$ is suitable wherein R is a hydrocarbon residue having 1 to 24, preferably 1 to 12, carbon atoms such as, for example, alkyl, aryl, or aralkyl, X is a halogen atom, and n is 0<n≦3. Examples are dimethylaluminum chloride, diethylaluminum chloride, diethylaluminum bromide, diisopropylaluminum chloride, methylaluminum dichloride, ethylaluminum dichloride, isopropylaluminum dichloride, trimethylaluminum, triethylaluminum, triisopropylaluminum, triisobutylaluminum, trioctylaluminum, tridecylaluminum, and ethylaluminum sesquichloride, with diethylaluminum chloride being particularly preferred.

4. Preparation of the solid catalyst component

The solid catalyst component used in the present invention is obtained by reacting the components [I] and [II] at first and then reacting the product with the component [III]. As to the reaction ratio of the components [I] and [II], the component [I]-(1) is used in an amount of 0.01 to 20 mmol, preferably 0.1 to 10 mmol, more preferably 0.2 to 4.0 mmol, per gram of the component [I]-(1).

As to the reaction ratio of the reaction product of the components [I] and [II] and the component [III], the component [III]/{the components [I]-(2)+[II]-(3)} (molar ratio) is usually 0.01 to 100, preferably 0.2 to 10, more preferably 0.5 to 5.

How to react the components [I] and [II] is not specially limited. Both components may be co-pulverized at a temperature of 0° to 200° C. for 30 minutes to 50 hours, or there may be adopted a method in which both components are mixed together under heating at a temperature of 50° to 300° C. for 1 minute to 48 hours in an organic solvent, such as inert hydrocarbons, alcohols, phenols, ethers, ketones, esters or mixtures thereof, and thereafter the solvent is remove. Preferably, after the treatement in an organic solvent, the solvent is removed.

How to contact the reaction product of the components [I] and [II] with the component [III] is not specially limited. But according to a preferred method, they are mixed together under heating at a temperature of 10° to 300° C., preferably 20° to 150° C., for 5 minutes to 10 hours, in the presence of an inert hydrocarbon solvent, thereby contacted and reacted together, followed by removal of the solvent by evaporation. Of course, the reacting operations for the preparation of the components [I] and [II] and the solid catalyst component should be performed in an inert gas atmosphere and in a moisture-free condition.

The following is a more detailed description about the organic solvents employable in the preparation of the components [I] and [II] and the solid catalyst component.

The aforementioned inert hydrocarbon solvents which may be used in the present invention are not specially limited if only they are inert to Ziegler catalysts commonly used. Examples are pentane, hexane, cyclohexane, heptane, octane, nonane, decane, benzene, toluene, xylene, and mixtures thereof.

The foregoing alcohols and phenols employable in the present invention indicate the compounds of the general formula ROH wherein R represents a hydrocarbon residue having 1 to 20 carbon atoms such as alkyl, alkenyl, aryl or aralkyl, or an organic residue containing oxygen, nitrogen, sulfur, chlorine, or another element. Examples are methanol, ethanol, propanol, butanol, pentanol, hexanol, octanol, 2-ethyl hexanol, phenol, chlorophenol, benzyl alcohol, methyl cellosolve, ethyl cellosolve, and mixtures thereof.

Preferred as the foregoing ethers are the compounds of the general formula R—O—R' wherein R and R', which may be the same or different, are each a hydrocarbon residue having 1 to 20 carbon atoms such as alkyl, alkenyl, aryl or aralkyl, or may be an organic residue containing oxygen, nitrogen, sulfur, chlorine, or another element, and R and R' may conjointly form a ring. Examples are dimethyl ether, diethyl ether, diisopropyl ether, dibutyl ether, diamyl ether, tetrahydrofuran, dioxane, anisole, and mixtures thereof.

Prefered as the foregoing ketones are the compounds of the general formula

wherein R and R', which may be the same or different, are each a hydrocarbon residue having 1 to 20 carbon atoms such as alkyl, alkenyl, aryl or aralkyl, or may be an organic residue containing oxygen, nitrogen, sulfur, chlorine, or another element, and R and R' may conjointly form a ring. Examples are acetone, methyl ethyl ketone, methyl isobutyl ketone, ethyl butyl ketone, dihexyl ketone, acetophenone, diphenyl ketone, cyclohexanone, and mixtures thereof.

As the foregoing esters, there are mentioned organic acid esters having 1 to 30 carbon atoms. Examples are methyl formate, methyl acetate, ethyl acetate, propyl acetate, octyl acetate, ethyl propionate, methyl butyrate, ethyl valerate, methyl methacrylate, methyl benzoate, ethyl benzoate, propyl benzoate, octyl benzoate, phenyl benzoate, benzyl benzoate, ethyl o-methoxybenzoate, ethyl p-methoxybenzoate, butyl p-ethoxybenzoate, methyl p-toluylate, ethyl p-toluylate , ethyl p-ethoylbenzoate, methyl salicylate, phenyl salicylate, methyl naphthoate, ethyl naphthoate, ethyl anisate, and mixtures thereof.

As examples of the foregoing nitriles there are mentioned acetonitrile, pripionitrile, butyronitrile, pentyronitrile, benzonitrile, hexanenitrile, and mixtures thereof.

As examples of the foregoing amines there are mentioned methylamine, ethylamine, diethylamine, tributylamine, piperidine, tribenzylamine, aniline, pyridine, picoline, tetramethylenediamine, and mixtures thereof.

By reacting the components [I] and [II] at first and then [III] there is obtained a solid catalyst component.

<2> Organometallic Compound

The catalyst used in the present invention comprises the above mentioned solid catalyst component and the organometallic compound.

As to the organometallic compound used in the present invention, there may be preferably employed an organometallic compound of a metal of Groups I–IV in the Periodic Table which is known as a component of Ziegler type catalyst. Particularly preferred are organoaluminum compounds and organozinc compounds. To illustrate these compounds, mention may be made of organoaluminum compounds of the general formulae $R_3Al$, $R_2AlX$, $RAlX_2$, $R_2AlOR$, $RAl(OR)X$ and $R_3Al_2X_3$ wherein R, which may be the same or different, is an alkyl or arkyl group having 1 to 20 carbon atoms and X is a halogen atom, as well as organozinc compounds of the general formula $R_2Zn$ wherein R, which may be the same or different, is an alkyl group having 1 to 20 carbon atoms. Concrete examples are triethylaluminum, triisopropylaluminum, triisobutylaluminum, tri-sec-butylaluminum, tri-tert-butylaluminum, trihexylaluminum, trioctylaluminum, diethylaluminum chloride, diisopropylaluminum chloride, diethylaluminum ethoxide, ethylaluminum sesquichloride, diethylzinc, and mixtures thereof.

The amount of the organometallic compound used is not specially limited. But usually it is in the range of 0.1 to 1,000 moles per mole of the titanium compound.

It is also preferable in the present invention that the organometallic compound component be used as a mixture or addition compound of the organometallic compound and an organic acid ester.

Where the organometallic compound component is used as a mixture of the organometallic compound and an organic acid ester, the organic acid ester is used usually in an amount of 0.1 to 1 mole, preferably 0.2 to 0.5 mole, per mole the organometallic compound. Where it is used as an addition compound of the organometallic compound and the organic acid ester, the molar ratio is preferably in the range of 1:1 to 1:2.

The organic acid ester is the ester of a saturated or unsaturated, mono- or dibasic organic carboxylic acid having 1 to 24 carbon atoms and an alcohol having 1 to 30 carbon atoms . Examples are methyl formate, ethyl acetate, amyl acetate, phenyl acetate, octyl acetate, methyl methacrylate, ethyl stearate, methyl benzoate, ethyl benzoate, n-propyl benzoate, iso-propyl benzoate, butyl benzoate, hexyl benzoate , cyclopentyl benzoate, cyclohexyl benzoate, phenyl benzoate, benzoic acid-4-tolyl, methyl salicylate, ethyl salicylate, methyl p-hydroxybenzoate, ethyl p-hydroxybenzoate, phenyl salicylate, cyclohexyl p-hydroxybenzoate, benzyl salicylate, ethyl α-resorcinol carboxylate methyl anisate, methyl p-ethoxybenzoate, methyl p-toluylate, ethyl p-toluylate, phenyl p-toluylate, ethyl o-toluylate, ethyl m-toluylate, methyl p-aminobenzoate, ethyl p-aminobenzoate, vinyl benzoate, allyl benzoate, benzyl benzoate, methyl naphthoate, and ethyl naphthoate.

Particularly preferred are alkyl esters, especially methyl esters, of benzoic acid, o- or p-toluic acid and anisic acid.

<3> Polymerization of Olefin

The olefin polymerization using the catalyst of the present invention can be performed in the form of slurry polymerization, solution polymerization or vapor phase polymerization. The catalyst used in the present invention is particularly suitable for vapor phase polymerization. The polymerization reaction is carried out in the same way as in the conventional olefin polymerization reaction using a Ziegler type catalyst. More particularly, the reaction is performed in a substantially oxygen- and water-free condition in the presence or absence of an inert hydrocarbon. Olefin polymerizing conditions involve temperatures ill the range of 20' to 120° C., preferably 40° to 100° C., and pressures in the range of atmospheric pressure 70 kg/cm² preferably 2 to 60 kg/cm² Adjustment of the molecular weight can be done to some extent by changing polymerization conditions such as the polymerization temperature and the catalyst mole ratio, but the addition of hydrogen into the polymerization system is more effective for this purpose. Of course, using the catalyst of the present invention, there can be performed two or more multistage polymerization reactions involving different polymerization conditions such as different hydrogen concentrations and different polymerization temperatures.

The process of the present invention is applicable to the polymerization of all olefins that can be polymerized using a Ziegler type catalyst, preferably α-olefins having 2 to 12 carbon atoms. For example, it is suitable for the homopolymerization of such α-olefins as ethylene, propylene, 1-butane, 1-hexene and 4-methyl-1-pantene and the copolymerization of ethylene and an α-olefin having 3–12 carbon atoms such as propylene, 1-butane, 1-hexene and 4-methylpentene-1, the copolymerization of propylene and 1-butene and the copolymerization of ethylene and one or more α-olefins.

Copolymerization with dienes is also preferable for the modification of polyolefins. Examples of diene compounds which may be used for this purpose are butadiene, 1,4-hexadiene, ethylidene norbornene and dicyclopentadien. The comonomer content in the copolymerization may be selected optionally. For instance, when ethylene and a α-olefin having 3-12 carbon atoms is copolymerized, the α-olefin content in the copolymer is preferably 0-40 molar %, more preferably 0-30 molar %.

<Effects of the Invention>

Homopolymers or copolymers of olefins prepared by using as catalyst the solid catalyst component and the organometallic compound in the present invention are remarkably high in bulk density, relatively large in average particle diameter and narrow in particle size distribution and have a reduced proportion of fine particles, so there is little adhesion of polymer to the reactor walls during polymerization thus permitting stable operations. Besides, not only dusting call be prevented in a forming operation and so the efficiency of the forming operation can be enhanced, but also it is possible to omit a pelletizing step.

Further, since the homopolymers or copolymers in question according to the present invention are narrow in molecular weight distribution, they can be formed into films having high strength and superior in transparency and also superior in anti-blocking property and heat-sealability.

<EXAMPLES>

The following examples are given to further illustrate the present invention and for practising the invention, but it is to be understood that the invention is not limited thereto.

Example 1

(a) Preparation of Solid Catalyst Component 50 g of $SiO_2$(FuJi-Daivison #955) which had been calcined at 600° C. was placed in a three-necked flask having a capacity of 500 ml and equipped with a stirrer and a reflux condenser, then 160 ml of dehydrated hexane and 2.2 ml of titanium tetrachloride were added, allowing reaction to take place for 3 hours under the reflux of hexane. After cooling, the supernatant liquid was removed by decantation, followed by drying under reduced pressure at 120° C. to remove hexane. (Component [I])

10 g of commercially available, anhydrous magnesium chloride and 4.2 g of aluminum triethoxide were charged into a stainless steel pot having an internal volume of 400 ml and containing twenty-five stainless steel balls each ½ inch in diameter, and ball-milling was conducted at room temperature in a nitrogen atmosphere for 16 hours to obtain a reaction product. (Component [II])

7.5 g of the reaction product thus obtained and 5.0 g of tetrabutoxytitanium were dissolved in 160 ml of dehydrated ethanol and the resulting solution was poured in the whole amount thereof into the three-necked flask containing the component [I]. Reaction was allowed to take place for 3 hours under the reflux of ethanol. After cooling, the supernatant liquid was removed by decantation, followed by drying under reduced pressure at 150° C. for 6 hours.

Then, 80 ml of a solution of diethylaluminum chloride in hexane (1 mmol/cc) was added thereto and reaction was allowed to take place for 1 hour under reflux of hexane. Then, hexane was removed by blowing nitrogen 70° C. to obtain a solid catalyst component. The content of titanium per gram of the solid catalyst component was 28 mg.

(b) Vapor Phase Polymerization

A stainless steel autoclave was used as a vapor phase polymerization apparatus, and a loop was formed using a blower, a flow control device and a dry type cyclone. The temperature of the autoclave was adjusted by flowing warm water through a jacket.

The solid catalyst component prepared above and triethylaluminum were fed at rates of 250 mg/hr and 50 mmol/hr, respectively, into the autoclave held at 80° C. At the same time, butene-1, ethylene and hydrogen gases were fed while adjusting the butene-1/ethylene ratio (molar ratio) in the internal vapor phase of the autoclave to 0.27 and also adjusting the hydrogen gas pressure to 17% of the total pressure, and polymerization was performed while the gases in the system were circulated. The resulting ethylene copolymer was a powder having a bulk density of 0.45, a melt index (MI) of 1.0, a density of 0.9208 and an average particle diameter of 650μ, not containing particles smaller than 150μ.

Catalytic activity was 250,000 g. copolymer/g.Ti. F.R. value (F.R.=MI10/MI2.16) of this copolymer represented the ratio of a melt index MI10 as measured under a load 10 kg to a melt index MI2.16 as measured under a load of 2.16 kg, both at 190° C., according to the method defined by ASTM-D1238-65T, was 7.6 and thus the molecular weight distribution was narrow.

Film was formed using this copolymer and it was extracted in boiling hexane for 10 hours. As a result, the hexane extraction was as small as 0.8 wt %.

Example 2

(a) Preparation of Solid Catalyst Component 50 g of $SiC_2$ (Fuji-Davison #955) which had been calcined at 600° C. was placed in a three-necked flask having a capacity of 500 ml and equipped with a stirrer and a reflux condenser, then 160 ml of dehydrated hexane and 2.2 ml of titanium tetrachloride were added, allowing reaction to take place for 3 hours under the reflux of hexane. After cooling, the supernatant liquid was removed by decantation, followed by drying under reduced pressure at 120° C. to remove hexane. (Component [I])

10 g of commercially available, anhydrous magnesium chloride and 4.2 g of aluminum triethoxide were placed in a stainless steel pot having an internal volume of 400 ml and containing twenty-five stainless steel balls each ½ inch in diameter, and ball-milling was performed at room temperature in a nitrogen atmosphere for 16 hours to obtain a reaction product.

7.5 g of the reaction product thus obtained and 10.0 g of tetrabutoxytitanium were dissolved in 160 ml of dehydrated ethanol and the resulting solution was poured in the whole amount thereof into the three-necked flash containing the component [I]. Reaction was allowed to take place for 3 hours under the reflux of ethanol. After coling, the supernatant liquid was removed by decantation, followed by drying under reduced pressure at 150° C. for 6 hours.

Then, 150 ml of a solution of diethylaluminum chloride in hexane (1 mmol/cc) was added thereto and reaction was allowed to take place for 1 hour under reflux of hexane. Then, hexane was removed by blowing nitrogen at 70° C. to obtain a solid catalyst component. The content of titanium per gram of the solid catalyst component was 33 mg.

(b) Vapor Phase Polymerization

Using the apparatus described in Example 1, the following vapor-phase polymerization was conducted.

The solid catalyst component prepared above and triethylaluminum were fed at rates of 250 mg/hr and 50 mmol/hr, respectively, into the autoclave held at 80° C. At the same time, butane-1, ethylene and hydrogen gases were fed while adjusting the butane-1/ethylene mole ratio in the internal vapor phase of the autoclave to 0.27 and also adjusting the hydrogen gas pressure to 17% of the total pressure, and polymerization was performed while the gases in the system were circulated. The resulting ethylene copolymer was a powder having a bulk density of 0.43, a melt index (MI) 1.0, a density of 0.9208 and an average particle diameter of 630μ, not containing particles smaller than 150μ.

Catalytic activity was 280,000 g. copolymer/g. Ti. F.R. value (F.R.=MI10/MI2.16) of this copolymer represented by the ratio of a melt index MI10 as measured under a load of 10 kg to a melt index MI2.16 as measured under a load of 2.16 kg, both at 190° C. according to the method defined by ASTM-D1238-65T, was 7.6 and thus the molecular weight distribution was narrow.

Film was formed using this copolymer and it was extracted if boiling hexane for 10 hours. As a result, the hexane extraction was as small as 0.9 wt %.

Example 3

A solid catalyst component containing 25 mg of titanium per gram thereof was prepared in the same way as in Example 1 except that 3.6 g of boron triethoxide was used in place of the aluminum triethoxide.

Using this solid catalyst component, polymerization was conducted in the same manner as in Example 1 except that the butene-1/ethylene mole ratio in the internal vapor phase of the autoclave was adjusted to 0.26. As a result, there was obtained a powder having a bulk density of 0.43, a melt index (MI) of 0.95, a density of 0.9210 and an average particle diameter of 650 μm, not containing particles smaller than 150 μm. Catalytic activity was as high as 220,000 g. copolymer/g. Tt. The R. R. value was 7.7, thus indicating a narrow molecular weight distribution, and the hexane extruction was 1.0 wt %.

Example 4

A solid catalyst component containing 26 mg of titanium was prepared in the same wav as in Example 1 except that 2.9 g of magnesium ethoxide was used in place of aluminum triethoxide.

Using this solid catalyst component, polymerization was performed in the same manner as in Example 1 except that the butene-1/ethylene mole ratio in the internal vapor phase of the autoclave was adjusted to 0.28. As a result, there was obtained a powder having a bulk density of 0.43, a melt index (MI) of 1.0, a density of 0.9205 and an average particle diameter of 730 μm, not containing particles smaller than 150 μm. Catalytic activity was as high as 210,000 g. copolymer/g.T. The F.R. value was 7.6, thus indicating a narrow molecular weight distribution, and the hexane extraction was 0.8 wt %.

Example 5

A solid catalyst component containing 27 mg of titanium per gram was prepared in the same way as in Example 1 except that 3.1 g of silicon tetraethoxide was used in place of aluminum triethoxide.

Using this solid catalyst component, polymerization was conducted in the same way as in Example 1 except that butene-1/ethylene mole ratio in the internal vapor phase of the autoclave was adjusted to 0.28. As a result, there was obtained a powder having a bulk density of 0.44, a melt index (MI) of 1.0, a density of 0.9215 and an average particle diameter of 600 μm, not containing particles smaller than 150 μm. Catalytic activity was as high as 200,000 g. copolymer/g. Ti. The F.R. value was 7.4, thus indicating a narrow molecular weight distribution, and the hexane extraction was 0.7 wt %.

Example 6

(a) Preparation of Solid Catalyst Component 50 g of $SiO_2$ (Fuji-Davison #955) which had been calcined at 600° C. was placed in a three-necked flask having a capacity of 500 ml and equipped with a stirrer and a reflux condenser, then 160 ml of dehydrated hexane and 2.2 ml of titanium tetrachloride were added, allowing reaction to take place for 3 hours under the reflux of hexane. After cooling, the supernatant liquid was removed by decantation, followed by drying under reduced pressure at 120° C. to remove hexane. (Component [I]).

10 g of commercially available, anhydrous magnesium chloride and 4.2 g aluminum triethoxide were placed in a stainless steel pot having an internal volume of 400 ml and containing twenty-five stainless steel balls each ½ inch in diameter, and ball-milling was performed at room temperature in a nitrogen atmosphere for 16 hours to obtain a reaction product.

7.5 g of the reaction product thus obtained and 5.0 of tetrabutoxytitanium were dissolved in 160 ml of dehydrated ethanol and the resulting solution was poured in the whole amount thereof into the three-necked flask containing the component [I]. Reaction was allowed to take place for 3 hours under the reflux of ethanol. After cooling, the supernatant liquid was removed by decantation, followed by drying under reduced pressure at 150° C. for 6 hours.

Then, 150 ml of a solution of diethylaluminum chloride in hexane (1 mmol/cc) was added thereto and reaction was allowed to take place for 1 hour under reflux of hexane. Then, hexane was removed by blowing nitrogen at 70° C. to obtain a solid catalyst component. The content of titanium per gram of the solid catalyst component was 28 mg.

(b) Vapor Phase Polymerization

Using the apparatus described in Example 1, the following vapor-phase polymerization was conducted.

The resulting ethylene copolymer was a powder having a bulk density of 0.46, a melt index (MI) of 0.95, a density of 0.9215 and an average particle diameter of 630μ, not containing particles smaller than 150μ. Catalytic activity was as high as 230,000 g. copolymer/g. Ti. F.R. value of this copolymer was 7.4 and thus the molecular weight distribution was narrow. The hexane extraction was as small as 0.9 wt %.

Example 7

A solid catalyst component was prepared in the same way as in Example 1 except that 140 ml of ethanol and 20 ml of 2-ethyl hexanol were used as a solvent in place of 160 ml of ethanol. Using this solid catalyst component, polymerization was performed in the same manner as in Example 1. The resultant copolymer was a powder having a bulk density of 0.45, a melt index (MI) of 0.95, a density of 0.9220 and an average particle diameter of 600 μm, not containing particles smaller than 150 μm. Catalytic activity was as high as 240,000 g. copolymer/g. Ti. The F.R. value was 7.5, thus indicating a narrow molecular weight distribution, and the hexane extraction was 0.7 wt %.

Example 8

A solid catalyst component was prepared in the same way as in Example 1 except that propionitrile was used as a solvent in place of ethanol. Using this solid catalyst component, polymerization was performed in the same manner as in Example 1. The resultant copolymer was a powder having a bulk density of 0.43, a melt index (MI) of 1.0, a density of 0.9230 and an average particle diameter of 610 μm, not containing particles smaller than 150 μm. Catalytic activity was as high as 220,000 g. copolymer/g. Ti. The R.R. value was 7/5, thus indicating a narrow molecular weight distribution, and the hexane extraction was 1.0 wt %.

Example 9

A solid catalyst component was prepared in the same way as in Example 1 except that $Al_2O_3$ was used in place of the $SiO_2$.

Using this solid catalyst component, polymerization was conducted in the same manner as in Example 1. As a result, there was obtained a powder having a bulk density of 0.42, a melt index (MI) of 0.82, a density of 0.9241 and an average particle diameter of 510 μm, not containing particles smaller than 150 μm. Catalytic activity was as high as 200,000 g. copolymer/g. Ti. The F.R. value was 7.6, thus indicating a narrow molecular weight distribution, and the hexane extruction was 1.1 wt %.

Example 10

A solid catalyst component was prepared in the same way as in Example 1 except that $SiO_2 \cdot Al_2O_3$ was used in place of $SiO_2$.

Using this solid catalyst component, polymerization was performed in the same manner as in Example 1. As a result, there was obtained a powder having a bulk density of 0.42, a melt index (MI) of 0.90, a density of 0.9220 and an average particle diameter of 520 μm, not containing particles smaller than 150 μm. Catalystic activity was as high as 210,000 g. copolymer/g. Ti. The F.R. value was 7.6, thus indicating a narrow molecular weight distribution, and the hexane extruction was 0.9 wt %.

Example 11

A solid catalyst component containing 28 mg of titanium and 7 mg of vanadium per gram thereof was prepared in the same way as in Example 1 except that 2.2 ml of titanium tetrachloride and 0.5 ml of triethoxyvanadyl were used in place of 2.2 ml of titanium tetrachloride.

Using this solid catalyst component, polymerization was performed in the same way as in Example 1. The resultant copolymer was a powder having a bulk density of 0.42, a melt index of 1.2, a density of 0.9231 and an average particle diameter of 700μ, not containing particles smaller than 150 μm. Catalytic activity was as high as 250,000 g. copolymer/g. Ti. The F.R. value was 7.9, thus indicating a narrow molecular weight distribution, and the hexane extraction was 1.2 wt %.

Comparative Example 1

(a) Preparation of Solid Catalyst Component 10 g of commercially available, anhydrous magnesium chloride and 4.2 g of aluminum triethoxide were placed in a stainless steel pot having all internal volume of 400 ml and containing twenty-five stainless steel balls each ½ inch in diameter, and boll-milling was performed at room temperature in a nitrogen atmosphere for 16 hours to obtain a reaction product.

A three-necked flask equipped with a stirrer and a reflux condenser was purged with nitrogen and then charged with 5 g of the reaction product obtained above and 5 g of $SiO_2$ (Fuji-Davison #952) which had been calcined at 600° C. Then, 100 ml of tetrahydrofuran was added and reaction was allowed to take place at 60° C. for 2 hours, followed by drying at 120° C. under reduced pressure to remove the tetrahydrofuran. Next, 50 cc of hexane was added. After stirring, 1.1 ml of titanium tetrachloride was added and reaction was allowed to take place under the reflux of hexane for 2 hours to obtain a solid catalyst component. The content of titanium per gram of the solid catalyst component was 40 mg.

(b) Vapor Phase Polymerization

Using the apparatus described in Example 1, a vapor-phase polymerization was carried out as follows.

The solid catalyst component prepared above and tri-ethylaluminum were fed at rates of 250 mg/hr and 50 mmol/hr,respectively, into the autoclave held at 80° C. At the same time, butene-1, ethylene and hydrogen gases were fed while adjusting the butane-1/ethylene mole ratio in the internal vapor phase of the autoclave to 0.25 and the hydrogen pressure to 15% of the total pressure, and polymerization was carried out while the gases in the system were circulated by the blower. The resultant ethylene copolymer was a powder having a bulk density of 0.41, a melt index (MI) of 1.2, a density of 0.9210 and an average particle diameter of 700μ, not containing particles smaller than 150μ.

Catalytic activity was 112,000 g. copolymer/g. Ti. The R.R. value was 7.6 and the hexane extraction as 1.1 wt %.

Comparative Example 2

(a) Preparation of Solid Catalyst Component 50 g of $SiO_2$ (FuJi-Davison #955) which had been calcined at 600° C. was placed in a three-necked flask having a capacity of 500 ml and equipped with a stirrer and a reflux condenser, then 160 ml of dehydrated hexane and 2.2 ml of titanium tetrachloride were added and reaction was allowed to take place under the reflux of hexane for 3 hours. After cooling, the supernatant liquid was removed decantation, followed by drying at 120° C. under reduced pressure to remove the hexane. (Component [I])

10 g of commercially available, anhydrous magnesium chloride and 4.2 g of aluminum triethoxide were placed in a stainless steel pot having an internal volume of 400 ml and containing twenty-five stainless steel balls each ½ inch in diameter, and ball-milling was performed at room temperature in a nitrogen atmosphere for 16 hours to obtain a reaction product. (Component [II])

7.5 g of the reaction product was dissolved in 160 ml of dehydrated ethanol and the resultant solution was poured in the whole amount thereof into the three-necked flask containing the component [I]. Reaction was allowed to take place under the reflux of ethanol for 3 hours. After cooling, the supernatant liquid was removed by decantation, followed by drying under reduced pressure at 150° C. for 6 hours.

Then, 80 ml of a solution of diethylaluminum chloride in hexane (1 mmol/cc) was added thereto and reaction was allowed to take place for 1 hour under reflux of hexane. Then, hexane was removed by flowing nitrogen at 70° C. to obtain a solid catalyst component. The content of titanium per gram of the solid catalyst component was 15 mg.

(b) Vapor Phase Polymerization

Using the apparatus described in Example (b), a vapor-phase polymerization was conducted as follows.

The solid catalyst, component prepared above and triethylaluminum were fed at rates of 250 mg/hr and 50 mmol/hr, respectively, into the autoclave held at 80° C. As the same time, butane-1, ethylene and hydrogen were fed while adjusting the butane-1/ethylene mole ratio in the internal vapor phase of the autoclave to 0.27 and the hydrogen pressure to 17% of the total pressure, and polymerization was carred out while the gases in the system were circulated by the blower. The resultant ethylene copolymer was a powder having a bulk density of 0.39, a melt index (MI) of 0.9, a density of 0.9204 and an average particle diameter of 720μ, not containing particles smaller than 150μ.

Catalytic activity was 120,000 g. copolymer/g. Ti. The F.R. value was 8.1 and the hexane extraction was 1.4 wt %.

What is claimed is:

1. A process for preparing a polyolefin by polymerizing an olefin or olefins in the presence of a catalyst comprising a solid catalyst component and an organometallic compound, the said solid catalyst component being prepared by reacting the following components (I) and (II) at first and then reacting the reaction product thus obtained with the following component (III):
   (I) a reaction product obtained by reacting:
      (1) a silicon oxide and/or an aluminum oxide, and
      (2) a titanium compound, or a titanium compound and a vanadium compound,
   (II) a reaction product obtained by the reaction of:
      (1) a magnesium halide,
      (2) a compound represented by the general formula Me(OR)$_n$X$_{z-n}$ wherein Me represents an element of Groups I to IV in the Periodic Table, z represents the valence of the element Me, n is o<n≦z, X is a halogen atom, and R is a hydrocarbon group having 1 to 20 carbon atoms, and
      (3) a titanium compound, or a titanium compound and a vanadium compound; and
   (III) an organoaluminum compound.

2. A process of claim 1 wherein the reaction ratio of the component (I)-(1) and the component (I)-(2) is 0.01 to 10.0 mmol of the component (I)-(2) per gram of the component (I)-(1).

3. A process of claim 1 wherein the reaction ratio of the components (II)-(1) and (II)-(2) is 0.01 to 10 in terms of Me/Mg (molar ratio).

4. A process of claim 2 wherein the reaction ratio of the components (II)-(1) and (II)-(2) is 0.01 to 10 in terms of Me/Mg (molar ratio).

5. A process of claim 1 wherein the reaction ratio of the component (II)-(3) is 0.01–5 in terms of (II)-(3)/(II)-(1) (molar ratio).

6. A process of claim 2 wherein the reaction ratio of the component (II)-(3) is 0.01–5 in terms of (II)-(3)/(II)-(1) (molar ratio).

7. A process of claim 3 wherein the reaction ratio of the component (II)-(3) is 0.01–5 in terms of (II)-(3)/(II)-(1) (molar ratio).

8. A process of claim 4 wherein the reaction ratio of the component (II)-(3) is 0.01–5 in terms of (II)-(3)/(II)-(1) (molar ratio).

9. A process of claim 1 wherein the reaction ratio of the components (I) and (II) is 0.01 to 20 mmol of the component (II)-(1) per gram of the component (I)-(1).

10. A process of claim 2 wherein the reaction ratio of the components (I) and (II) is 0.01 to 20 mmol of the component (II)-(1) per gram of the component (I)-(1).

11. A process of claim 1 wherein the olefin is ethylene.

12. A process of claim 1 wherein the olefins are ethylene and an α-olefin having 3–12 carbon atoms.

13. A process of claim 1 wherein the titanium compound I-(2) is a titanium tetrahalide.

14. A process of claim 1 wherein the organoaluminum compound is a compound represented by the general formula R$_n$AlX$_{3-n}$ wherein R is a hydrocarbon radical or group having 1 to 24 carbon atoms, X is a halogen atom, and n is O<n≦3.

15. A process of claim 1 wherein the organometallic compound is an organoaluminum compound.

16. A process of claim 1 wherein the organometallic compound is used together with an organic acid ester.

17. A process of claim 1 wherein the polymerization reaction is conducted at a temperature of 20° C. to 120° C. and a pressure of atmospheric pressure to 70 Kg/cm².

18. A process for preparing a polyolefin as set forth in claim 1 wherein the titanium compound II-(3) is a compound represented by the following general formula or a reduced product thereof:

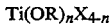

where R is an alkyl, aryl or aralkyl group having 1 to 20 carbon atoms, X is a halogen atom, and n is in the range of 0≦n≦4.